May 17, 1966     O. R. SCHULER     3,251,123
METHOD OF FIN-FORMING AND ATTACHING SAID FIN TO A TUBE
Original Filed July 10, 1961     5 Sheets-Sheet 1

INVENTOR.
OTTO R. SCHULER
BY Whittemore Hulbert
 & Belknap
ATTORNEYS

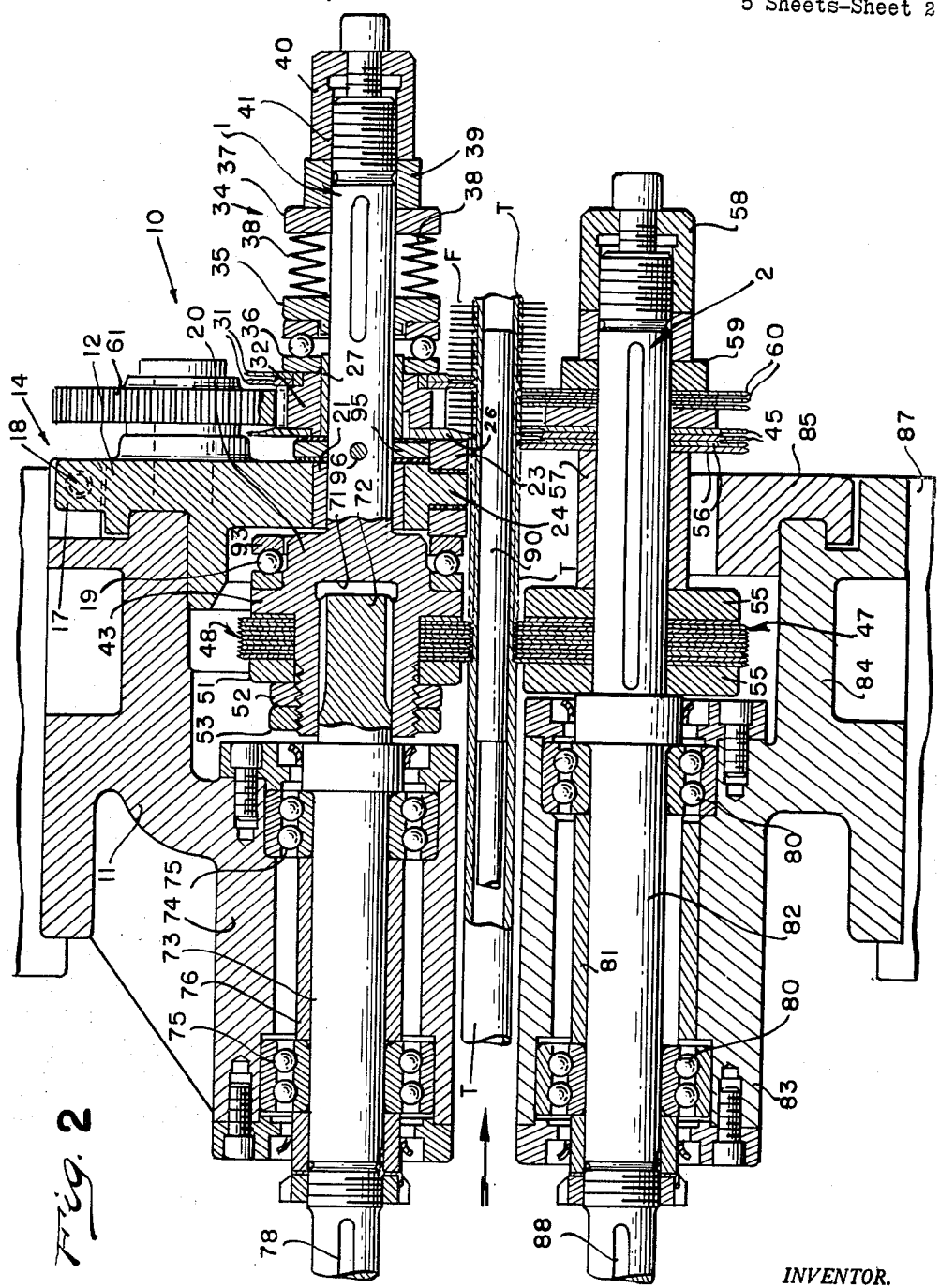

May 17, 1966
O. R. SCHULER
3,251,123
METHOD OF FIN-FORMING AND ATTACHING SAID FIN TO A TUBE
Original Filed July 10, 1961
5 Sheets-Sheet 3
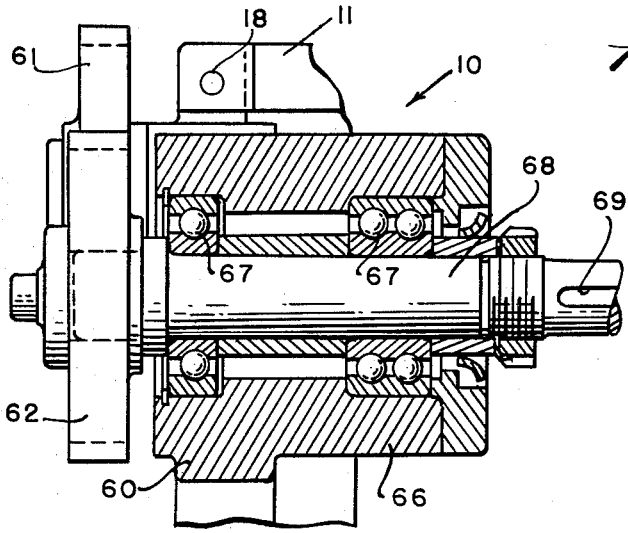
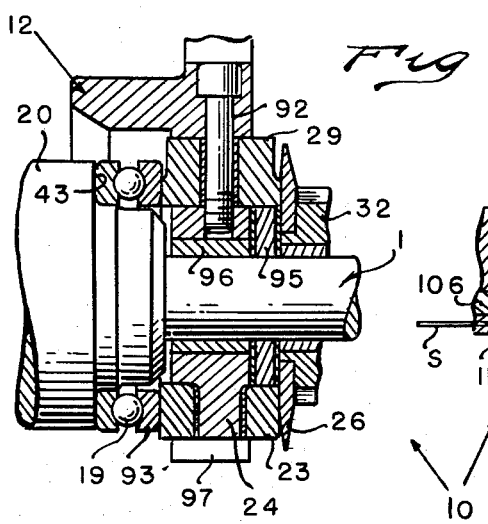
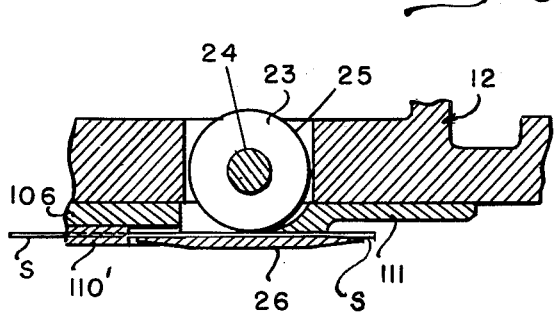
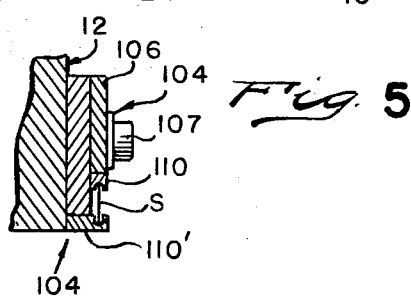
INVENTOR.
OTTO R SCHULER
BY Whittemore, Hulbert
Belknap
ATTORNEYS

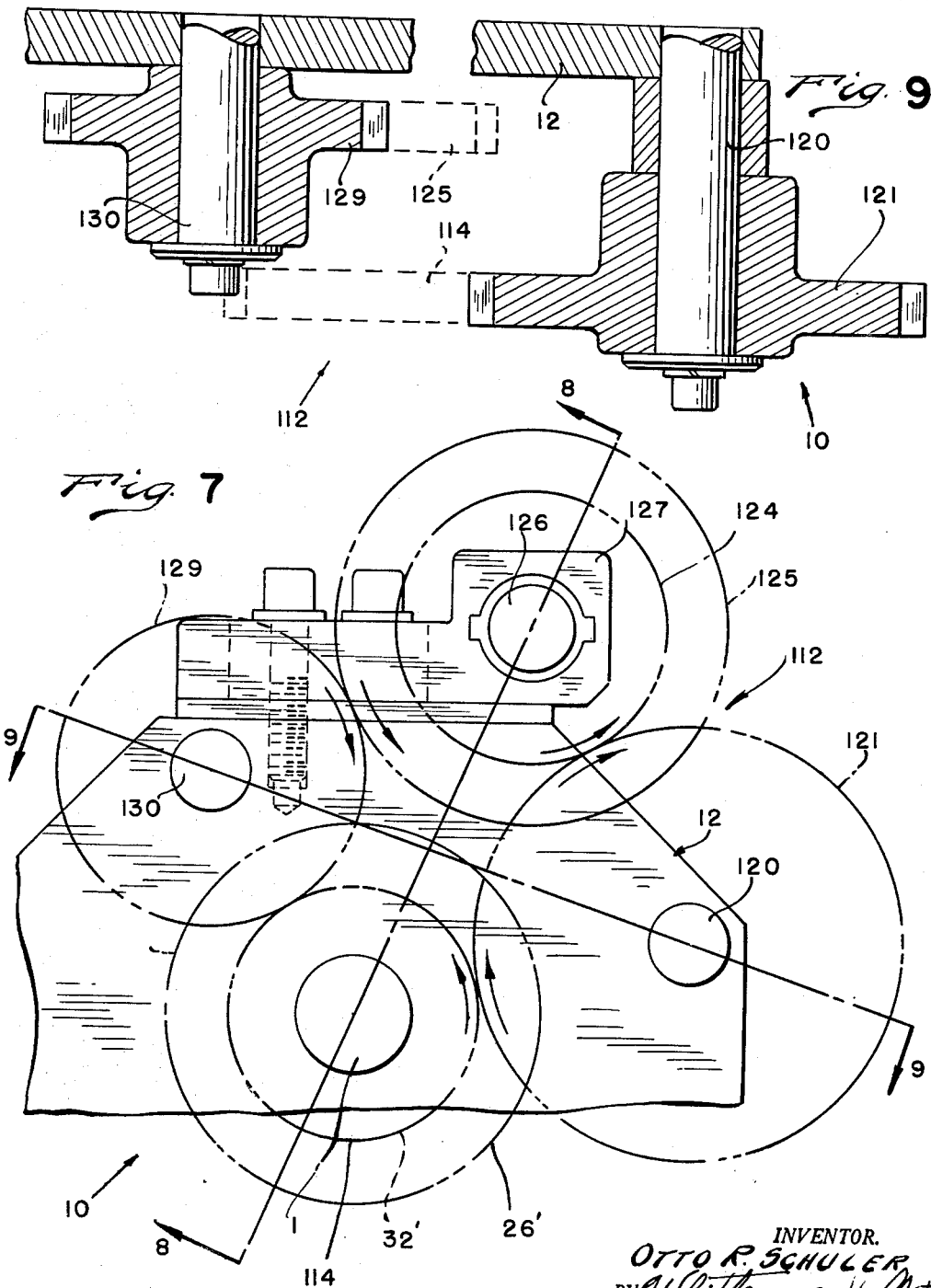

May 17, 1966     O. R. SCHULER     3,251,123
METHOD OF FIN-FORMING AND ATTACHING SAID FIN TO A TUBE
Original Filed July 10, 1961     5 Sheets-Sheet 5

INVENTOR.
OTTO R. SCHULER
BY Whittemore Hulbert Belknap
ATTORNEYS

United States Patent Office 3,251,123
Patented May 17, 1966

3,251,123
METHOD OF FIN-FORMING AND ATTACHING SAID FIN TO A TUBE
Otto R. Schuler, Detroit, Mich., assignor to Calumet & Hecla, Inc., Allen Park, Mich., a corporation of Michigan
Original application July 10, 1961, Ser. No. 122,703, now Patent No. 3,161,944, dated Dec. 22, 1964. Divided and this application Sept. 16, 1964, Ser. No. 402,049
5 Claims. (Cl. 29—157.3)

The present application is a division of my copending application, Serial No. 122,703, filed July 10, 1961, now Letters Patent No. 3,161,944 of December 22, 1964; which was a continuation-in-part of an application copending therewith, Serial No. 839,770, filed September 14, 1959, now Letters Patent No. 3,148,441 of September 15, 1964; which was in turn a continuation-in-part of application Serial No. 734,573, filed May 12, 1958 (now abandoned). The present invention relates to improved methods for applying fin material to hollow tubes.

In accordance with the methods of the invention herein shown and described, the fin is specially preformed as to cross-section and attached as a wound coil on a grooved tube, coming to the latter directly from a straight strip of the fin material. The present improvement is directed in particular to the production of a type of attached-fin tube in which only very slight corrugations, or none at all, can be allowed in the inner radial margin of the fin material.

Various considerations, including the O.D. of the tube, the radial width and axial thickness of the fin, its material, and the like, determine the optimum procedure for applying the fin to the tube. Thus, a thin, smooth fin of ¼" radial height applied on a 1" diameter tube can be termed a low fin, and can in most cases be applied to the grooved tube directly from a straight strip of the fin material under tension alone, without requiring any preshaping or preforming to enable it to better enter the groove. In that case the ratio of tube diameter to outside diameter of fin is 1:1½.

However, when the same fin is attached to a tube of ¼" diameter, it is a different matter. Now the ratio of tube diameter to outside fin diameter is 1:3, and the straight strip material may have to be thinned out considerably towards its outside edge by preshaping it into a tapered and round fin capable of best entering between groove defining helical ribs of the tube.

In any event, the proper method of producing a certain size fin of a certain material and shape will be determined by the ratio of tube O.D. to outside fin diameter, taking also into consideration the hardness, ductility and thickness of the fin material.

The apparatus herein illustrated and described is typical of what may be employed for carrying out a preforming of the fin material in the manner and for the purpose described; and in accordance with the method the preformed material may be applied to a previously grooved tube, or one which is provided with helical grooves coordinately with the fin forming and attaching operations. Essentially, the illustrated embodiments show typical production equipment making possible the application of a resiliently biased axial thrust on coacting forming members in the preforming and tapering of the fin; the simultaneous forming of the fin grooving, if desired; the axial, anti-friction backing of one of the forming members; the positive driving of the latter at the same or different speeds; the restraining of the fin material as it is being tapered and applied to the tube grooves; the final clinching of the fin in the grooves; and the like.

Unless it is otherwise indicated, it is to be understood that the steps of the improved method for the preforming, applying and clinching of the fin material may be considered as being combinable with the operation of forming the grooves in the tube, thus contemplating the use of a single machine performing a comprehensive operation to produce a fully finned tube from plain tube and fin strip components.

It is one object of the present invention to provide an improved fin preforming and attaching method, in accordance with which a roll and disc type fin preforming device is mounted directly and closely adjacent one of the usual three arbors upon which certain attaching discs are borne. The fin-forming roll is mounted in this position to rotate about an axis disposed other than parallel to the arbor axis, for example at 90° thereto.

A further object is to provide a method utilizing such a roll and disc type fin preforming device combined with fin attaching discs on the three arbors of the apparatus, in which the axial distance between the preforming roll-disc set and the attaching discs may be kept at a minimum; and in which the axial distance between the grooving means and the preforming means may also be kept at a minimum.

Still further, the method of the invention contemplates the use of adjustable spring pressure to determine and maintain uniform the axial force under which the fin material is engaged between the special forming roll and forming disc, in order to minimize or eliminate possible side effects.

Yet another aspect of this invention is a contemplated adjustment of the fin preforming roll axis, from a 90° intersecting relation to that of the tube being finned through a desired limited number of degrees from the 90° relationship, thus making possible an improved centering of the fin material with respect to the tube axis.

A more specific object is to provide a fin forming and attaching method in accordance with which insurance is made that pressures set up on the forming roll and disc are duly compensated by suitable anti-friction bearing provisions.

The foregoing as well as other objects will become more apparent as this description proceeds, especially when considered in connection with the accompanying drawings illustrating preferred embodiments of the invention, wherein:

FIG. 2 is a view partially broken away and in vertical longitudinal section along line 2—2 of FIG. 1;

Figure 1:
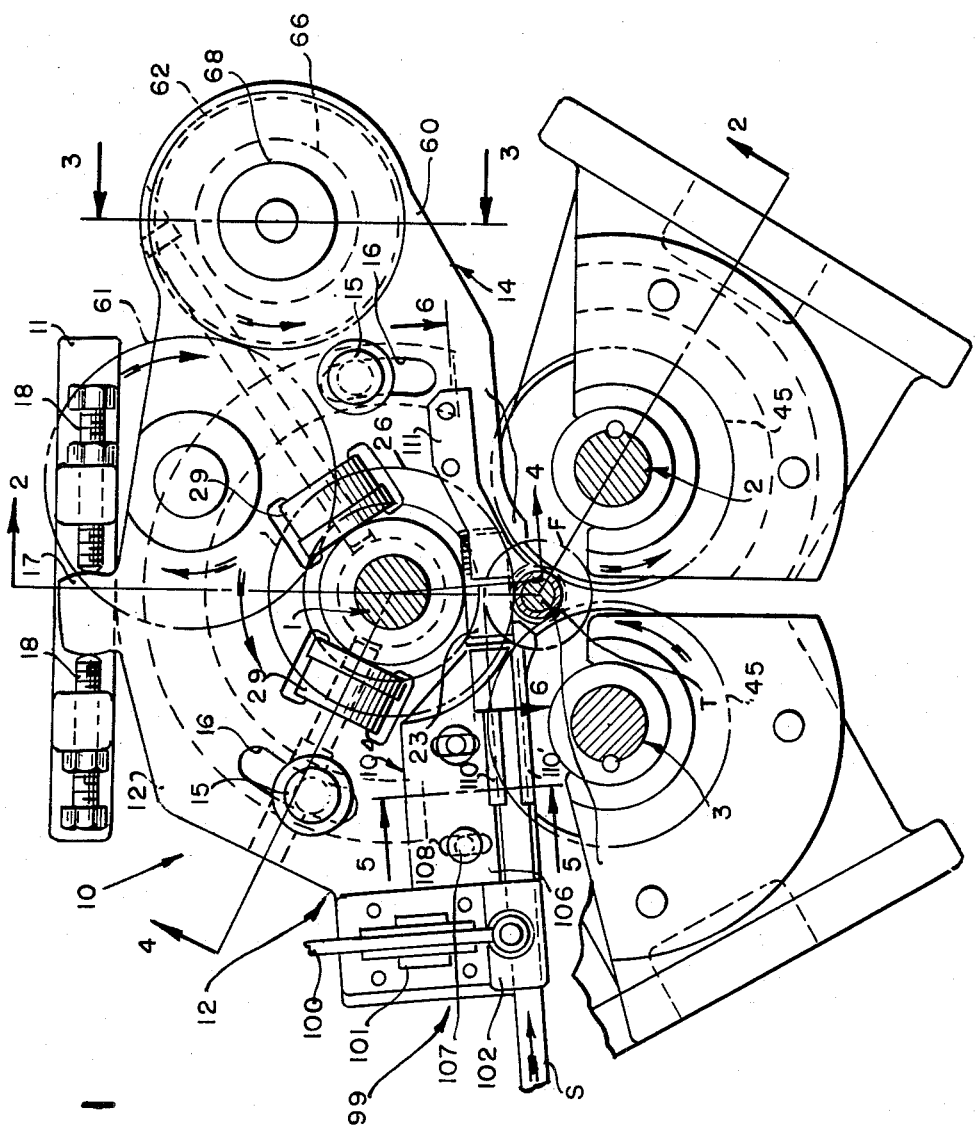
FIG. 1 is a view in transverse vertical section through a typical embodiment of equipment for performing the method of the invention.
Figure 8:
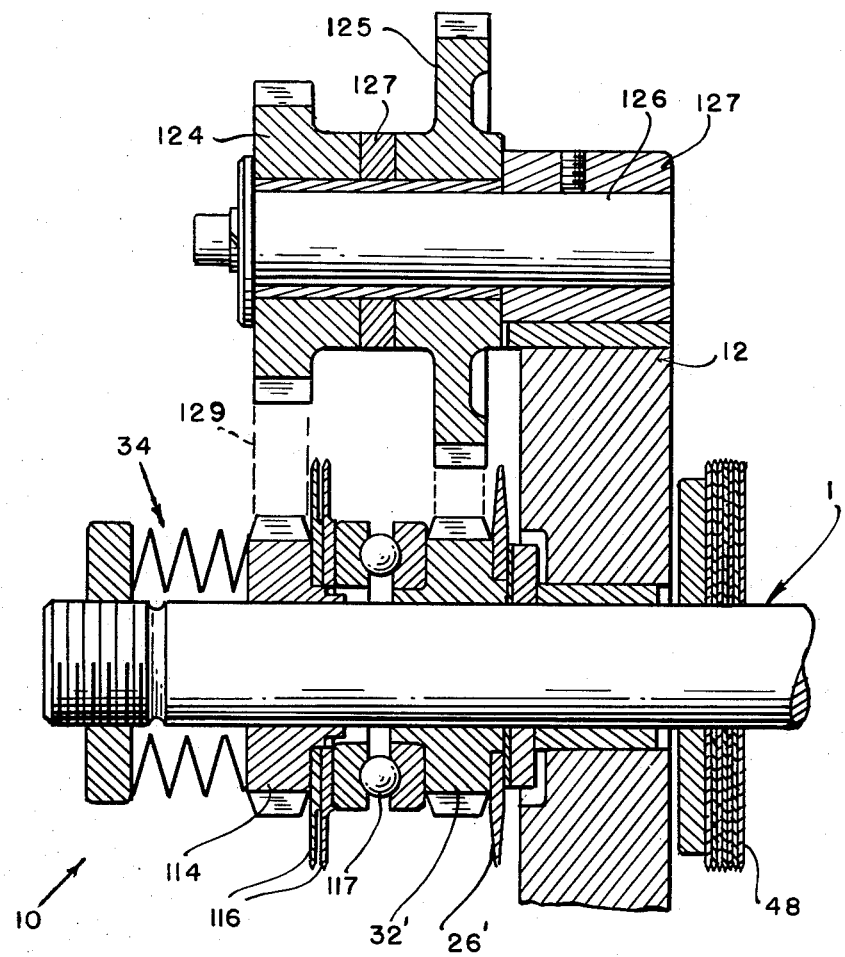

FIGS. 3 through 6 are, respectively, fragmentary views in section along lines 3—3, 4—4, 5—5 and 6—6 of FIG. 1;

FIG. 7 is a somewhat schematic end elevational view illustrating a proposed arrangement for driving the fin forming disc positively, as from a tube grooving disc set, but at a higher rotative speed; and FIGS. 8 and 9, are respectively, views in section along line 8—8 and 9—9 of FIG. 7.

The reference numerals 1, 2 and 3 designate three parallel arbors disposed in a 120° angular spacing of their axes; and these arbors are mounted appropriately for rotation on the fin preforming and attaching unit of the invention, which is generally designated by the reference numeral 10.

The unit 10 includes an appropriately rugged base 11 upon which a mounting bracket 12 is carried for an adjustment about the axis of the arbor 1, for a purpose to be described. Such adjusting means is generally designated in FIGS. 1 and 2 by the reference numeral 14, and includes (FIG. 2) a pair of studs 15 fixed on base 11 and extending horizontally through arcuate slots 16 in the mounting bracket 12. The latter has an integral upstanding lug 17 at its top which is received between adjustable set screws 18 threadedly carried by the base 11, thus enabling a ready variable adjustment of a forming roll (to be described), which is carried by bracket 12, about the axis of a tube T to be provided with helical finning F.

Bearing provisions for the arbor 1 in the bracket 12 include an axial thrust ball bearing 19 (FIG. 2) which backs against an integral enlargement 20 on the arbor 1, and a bushing 21 in bracket 12. A basic forming roll 23 of the unit 10 bears against bearing 19, being rotatable on an axis radial to that of arbor 1. Roll 23 is journaled approximately on a stud 24 integral with mounting bracket 12 and projecting into a roll-receiving recess 24 in the latter, as shown in FIG. 6.

A basic fin forming disc 26 is mounted on arbor 1 for coaction with the forming roll 23, the disc idling a bushing 27 on the arbor and being backed up by a pair of backing rollers 29 (FIG. 1) which are radially journaled on bracket 14 and act between the disc 26 and the near race of ball bearing 19, as shown in FIG. 4. A pair of attaching discs 31 are coaxially associated with the fin forming disc 26, these three discs being fixed to an annular pinion 32 which runs on the bushing 27. Pinion 32 has means to drive the same (to be described).

An adjustable spring type pressure applying unit 34 is mounted upon the arbor 1 on the side of the discs 31 opposite forming roll 23 and disc 26. This unit comprises an abutment washer or collar 35 sleeved on arbor 1 and inwardly abutting a ball bearing 36 alongside the attaching discs 31; a further collar 37 also sleeved on the arbor; and a plurality of axially extending, heavy duty coil compression springs 38 acting between the collars. Collar 37 is sustained axially outwardly by an abutment ring 39 and is in turn abutted by a tubular adjusting cap 40 which is threadedly engaged at 41 with the outer end of arbor 1.

Thus the springs 38 force forming disc 26 against the fin material in forming the same in the manner contemplated by the method of the invention. The degree of force is adjusted by threadedly manipulating the adjusting cap 40. The desirability or need for these adjustable spring provisions arises from the conditions encountered in the operation of the unit 10 in forming straight elongated fin strip material S and applying it to a tube T as finning F.

Thus, the arbor 1 of the fin forming unit is constantly under high tension between a shoulder flange 43 of the arbor enlargement 20, against which the bearing 19 abuts, and the cap 40, and any variation in the distance between these two points during operation tends to affect the shape or width of the fins, as formed by the roll 23 and disc 26. Such variation might arise due to the effect of heat or uneven pressures, due to a forming disc of variable thickness, or a weak one, or a weak arbor. These sources of trouble must be eliminated to the extent possible.

Accordingly, the presence of the adjustably resilient force supplying unit 34 minimizes side effects by insuring that the fin forming pressure is not applied rigidly, but rather in a way to enable it to be self-adjusting, and to be applied in an even and balanced fashion. This will accommodate arbor expansion, fin width variation, and even some slight dishing of the forming disc 26. If the disc has a slightly variable thickness or shape, it will nevertheless be pressed against the fin strip (designated S in FIG. 1) with the same pressure, and the spring means insures a constant pressure rolling action at the rolling zone of the forming roll 23.

Unit 10 is shown as incorporating a pair of idling attaching discs 45 on the arbors 2 and 3, which are similar to discs 31 and are located closely adjacent and outwardly of the forming disc 26.

As indicated above, the fin forming members of the unit 10 may be associated with provisions for forming grooving in the tube T as a combined incident to the forming and attachment of the fin stripping F.

To this end, a set of grooving discs 47 is fixedly secured on each of the arbors 2 and 3, and the arbor 1 carries, rearwardly of its enlargement flange 43, a set of idler discs 48 which follow in the grooving produced by the discs 47, the discs 48 backing up the tube T and coacting with the set 47 in grooving the tube. It is desirable to positively drive all three sets of tube grooving rollers; however, the use of one set of idling back-up discs is a variant arrangement usable under certain conditions.

As for structural details, shown in FIG. 2, the idler grooving discs 48 may be clamped up between an annular pressure member 51 and the enlargement flange 43 by means of lock nuts 52, 53. As for the grooving discs 47 on arbors 2 and 3, they are respectively in fixed relation to the latter, being assembled between similarly fixed collars 55 on arbors 2, 3. In addition to attaching discs 45 on arbors 2 and 3, those arbors may carry one or more groove sizing discs 56, which travel the helical grooving of the tube, as shown in FIG. 2. Should there be a variation in width of the multiple grooves, the disc or discs 56 corrects this and makes the insertion of the fin material in the grooves more sure and positive.

A spacer sleeve 57 on each of the arbors 2 and 3 separates the tube grooving assembly from the sizing and attaching disc assembly; and an adjustable cap 58 threaded on arbor 2 and an interposed optional spacing sleeve 59 are employed to clamp up the two assemblies on the respective arbors 2 and 3. If desired, those arbors may also receive a set of fin straightening discs 60, which correct and straighten any tilt in the fin material after passing the forming disc 26 on arbor 1, due to the heavier cross section of that disc, although such tilt may be desirable in some applications. It is desirable to maintain the grooving and the sizing, attaching and straightening assemblies as close together in the axial sense as possible, just as it is desirable to maintain as close as possible a spacing of the forming disc 26 from the attaching discs 31 on arbor 1, and as close as possible a spacing of these last named discs in the axial direction from the two grooving sets 47 and 48.

Reference has been made to the means (generally designated 14) to permit a limited angular adjustment to the bracket 12 and all parts carried thereby about the axis of arbor 1, i.e., from a position in which the axis of forming roll is normally in 90° intersecting relation to the axis of the tube T, to an acutely angled relationship thereto. This is made possible by the studs 15 (FIG. 1) received in arcuate slots 16 of mounting bracket 12, the adjustment being made by manipulation of set screws 18.

It has been found that, with the forming roll 23 set up directly on a line through the axes of arbor 1 and the tube, the fin material S is not formed accurately about the tube on the axis of the latter, especially at commencement of the forming and attaching operation; but is somewhat offset, hence cannot be wrapped about the tube on a true center. Thus the offsetting adjustment shown in FIG. 1 is provided, permitting the entire forming roll unit to be shifted angularly relative to arbor 1, thereby offsetting the axis of roll 26 to any required or desired position.

Mention has been made that it is desirable that the tube grooving discs 47, 48 be set up as closely as possible, axially, to the fin forming disc 26 and that the latter be kept just as close as possible to the attaching discs 31, 45, particularly when tube forming and fin forming discs are driven positively. Due to industrial allowable tolerances in a given basic tube T, as to diameter, wall thickness, wall concentricity, hardness, straightness, and the like, practically every tube will stretch differently during the grooving and fin attaching operations, under tension necessarily borne thereby. Due to the use of a number of tube grooving discs in each groove set, the spacing of grooves on each separate tube is fairly constant; however, enough variation in spacing may still exist that the tube grooves may not match the fin forming disc 26 upon reaching the latter from the grooving discs. Hence, the desirability of placing these two operations just as close together axially as possible, to minimize the axial variation. Of course, if variation in spacing still interferes with proper fin forming and attaching, even at a close intervening distance, one of the units may be made self-aligning axially to match tube grooving with tube forming and attaching, but this complicates the design.

Furthermore, due to an uneven wall thickness, or even a slight bow or bend in the tube T, a twisting and whipping action may be set up in the tube grooving operation. This is minimized if the tube grooving and fin forming and attaching units are kept as close together as possible.

As for the placement of fin forming disc 26 and attaching discs 31, 45 as close together axially as possible, this is dictated by the desirability of directly inserting the fin material, as formed between roll 23 and disc 26, into a groove of the tube, so that as it enters between the attaching discs 45 of the next arbor it is squeezed tight between the groove defining ribs of the tube, being later subjected to the action of attaching discs 31 on arbor 1. However, at the start of finning of a tube, or after passage of a tube's plain, ungrooved end, there must be a short unfinned but grooved section into which the attaching discs can be inserted when the unit closes on the tube. The attaching discs on all three arbors must be down at the root of the tube groove or the start of the fin cannot be formed correctly. It cannot be squeezed tightly between the tube ribs, and the first few fin turns will be loose and over-size, or succeeding fins might simply ride on the top of the ribs.

FIGS. 1 through 6 illustrate an embodiment of the equipment used in practicing the invention, in which provisions are made not only to drive the three tube grooving units 47 and 48 of the apparatus positively and at equal speed, but also to positively drive the forming disc 26 on arbor 1 positively and at a rotative speed greater than the speed of the grooving units.

The provisions for angularly adjusting the mounting bracket 12 of this embodiment of the invention have been described above, comprising the studs 15 received in arcuate slots 16 in bracket 12, plus the upstanding lug 17 received between adjustable set screws 18.

The bracket 12 is provided with an integral, angularly offset extension 60 which, as shown in FIGS. 1 and 2, rotatively mounts in a suitable way an intermediate gear 61. Gear 61 meshes with and is driven by a power input gear 62 of the grooving and fin attaching mechanism, generally designated 10. For the purpose of mounting gear 62 (FIG. 3), the mounting bracket extension 60 has an integral, rearwardly extending bearing boss 66 receiving ball bearings 67 by which a shaft 68 carrying drive gear 62 is mounted. The shaft extends externally and is provided with a key or spline 69, by which the shaft is connected to a suitably variable speed drive device (not shown) as through universal driving connections (also not shown).

Referring to FIG. 2, the intermediate gear 61 meshes with the pinion 32, as mounted by bushing 27 on the arbor 1, for rotation (together with the forming disc 26 keyed or otherwise fixed to pinion 32) at a rotative speed greater than that of the arbor 1. The tube grooving disc set 48 associated with that arbor is similarly driven, as will be described in connection with FIGS. 7-9, also.

For the drive of the set 48 and the arbor 1 together at the same, though variable speed, the rear enlargement 20 of the arbor (FIG. 2) has an axial rearwardly opening bore 71 which is splined to drivingly receive the forward splined end 72 of a drive shaft 73. Shaft 73 is journaled in a housing extension 74 integral with the mounting base 11, as by roller bearings 75 separated by a spacing sleeve 76; and the shaft 73 projects outwardly of the housing 74, where it is provided with a key or spline 78. This spline, or like driving provision, like that on the gear shaft 68 which drives the forming disc 26, is employed to connect the arbor-driving shaft 73 with a suitable variable speed drive unit (not shown) as through universal coupling means (also not shown).

Arbors 2 and 3 of the apparatus have similar provisions for driving their respective tube grooving disc sets 47, as well as the groove sizing, fin attaching and fin straightening discs keyed on those respective arbors. Briefly, such provisions comprise roller bearings 80 and a bearing spacing sleeve 81 mounting an extension 82 of the arbors 2 and 3 within a housing 83 which is constituted by a rearwardly extending tubular boss integrally formed on an adjustable bearing structure 84 associated with the mounting bracket 12. If desired, a bearing device 85 may be provided outboard of the grooving disc set 47 to back up the respective arbors 2 and 3, by engaging the sleeve 57 which spaces the set 47 from the sizing discs 56. Bearing device 85 is carried by a movable slide 87 (FIG. 2), by which the respective arbors may be moved in and out on radii of the axis of tube T, as the requirements of the finning operation dictate, and in particular when plain ended or interrupted fin tube lengths are to be formed.

Arbor extension 82 also has external spline means 88 by which it is connected by suitable coupling provisions to the variable speed drive unit referred to above (not shown), and by which the arbors 2 and 3 are positively driven at rotative speed equal to that of the arbor 1, the grooving disc sets 47, 48 being accordingly driven in the same fashion.

FIGS. 1 and 2 show a central mandrel 90 about which the tube T passes axially in the formation of its grooves and the application of its finning F.

FIG. 4 of the drawings illustrates details of an improved mounting for the disc backing rollers 29 for forming disc 26. As freely journaled on radial pins 92, the rollers run on a race 93 of bearing 19, referred to above, the other race of which abuts the shoulder 43 on the arbor enlargement 20 (per FIG. 2). A supporting ring 95 pinned on arbor 1 at 96 may axially support the fin-forming disc 23 and its pinion 32, but this is optional, particularly in view of the axial biasing unit 34. A bottom journal support or seat for the fin preforming roll 23 is shown at 97 in FIG. 4.

The reference numeral 99 in FIG. 1 generally designates a spring loaded, toggle type of clamp mounted on bracket 12 for engaging the flat sides of the fin strip material S as it enters the machine and applying tension to the strip. The purpose of this is to enable the preformed fin to be brought quickly down into the groove of tube T, at the start of an operation, before the fin reaches the attaching discs on arbors 2 and 3. As soon as the beginning of the fin is securely clamped by the attaching discs between the groove-defining ribs of the tube, the clamp 99 is released to remove the additional tension. Details of the toggle tension clamp device constitute no part of the invention, but it may be considered as having an operating arm 100 suitably mounted at 101 and adapted to operate a movable jaw 102 through toggle provisions (not shown) to clamp the strip.

As illustrated in FIGS. 1, 5 and 6, the apparatus 10 is also equipped with an adjustable fin strip guide 104, by which the strip S is accurately guided into the bite of the forming roll 23 and disc 26. This comprises a plate 106 mounted by means of studs 107 and vertical slots 108 for vertical adjustment relative to mounting bracket 12. Carbide inserts 110, 110' carried by the plate 106 guide the strip S.

Mounting bracket 12 is also equipped with a further fin guide 111 (see FIG. 6), which guides the fin from the forming roll 23 and forming disc 26 to position between the first and second attaching discs.

FIGS. 7, 8 and 9 illustrate an alternative arrangement for driving the apparatus, employing a gear train, generally designated by the reference numeral 112, mounted forwardly of the arbor mounting base and bracket 12. It is contemplated that gears and pinions of different ratios may be employed to secure different rotative speeds of the arbor 1 (as driven in the manner of FIG. 2, for example) relative to its forming disc and grooving set 48. Only essential components are shown. In this arrangement, the fin forming disc, specially designated 26', is keyed or otherwise fixedly secured on the hub of the toothed pinion 32' which, like pinion 32, idles on the arbor 1 forwardly of bracket 12. A further driving gear 114 is keyed or otherwise fixedly secured to arbor 1 to rotate therewith. Fin attaching discs 116, shown as two in number, also rotate with arbor 1, either being keyed directly to the latter or, as illustrated in FIG. 8, to a hub on gear 114. An axial thrust bearing 117 is interposed between the inner disc 116 and the pinion 32'.

Bracket 12, as shown in FIGS. 7 and 9, supports a stub shaft 120, upon which a gear 121 idles, being in mesh with the driving gear 114 on arbor 1; and gear 121 also meshes with a pinion or gear 124 which, as shown in FIGS. 7 and 8, is axially aligned with a further gear 125 of larger diameter. The gears 124, 125 rotate as a gear set about a stub shaft 126 upon which they are mounted by suitable bushing provisions 127. Shaft 126 is fixedly mouned by means of a supplemental bracket 127 to the top of the main arbor and shaft mounting bracket 12.

The larger diameter gear 125 meshes with a pinion 129 idling upon a still further stub shaft 130 carried by bracket 12; and gear 129 meshes with the idler 32' on arbor 1, to which fin forming disc 26' is secured. The train of gear drive is from driving gear 114 to idler 121, thence to the smaller diameter gear 124 on stub shaft 126, driving the larger diameter gear 125. Gear 125 in turn meshes with idler 129 and, through the latter, drives the disc carrying idler 32' on arbor 1. Thus a change gear arrangement of this sort enables the driving of the tube grooving disc set 48 on arbor 1, as well as the fin forming disc 26 on the arbor, both positively and in varying speed relationships, as desired, to one another.

Thus, it is seen that, where the nature of the fin material S is such that the metal of which it is made, or its radial width, or its axial thickness, and like considerations, require its preforming by thinning or tapering the same as an incident to its helical formation and application to the tube, the method of the invention is adapted to meet the varying requirements. Considerable latitude is afforded as to whether forming roll, forming disc and attaching disc means are to be positively driven or not, and, if driven, at the same speed or a speed varying with that of the grooving means; and various provisions are made for adjustment of pressures, positional relationships, and the like, to best accommodate the situation.

The drawings and the foregoing specification constitute a description of the improved fin-forming and fin-attaching methods in such full, clear, concise and exact terms as to enable any person skilled in the art to practice the invention, the scope of which is indicated by the appended claims.

What I claim as my invention is:

1. A method for use in the forming of an attached fin type of tube, comprising the steps of subjecting the tube to a positively rotative grooving action serving to provide a helical groove thereon and to produce a rotation and axial advance of the tube, supplying elongated fin material to the perimeter of the grooved tube in a direction transverse of the axis thereof, and subjecting the material as it is engaged with the tube grooving at said perimeter to a rolling action between opposed surfaces on rotative axes at substantially 90° to one another, which action is of a nature and force sufficient to preshape the material to an outwardly tapered cross-section and toward a coiled outline about the tube.

2. A method in accordance with claim 1, and further comprising the securing of the preshaped fin material in the helical grooving of the tube.

3. A method for use in the forming of an attached fin type of tube, comprising the steps of subjecting the tube to a positively rotative grooving action serving to provide a helical groove thereon and to produce a rotation and axial advance of the tube, supplying elongated fin material to the perimeter of the grooved tube in a direction transverse of the axis thereof, and subjecting the material as it is engaged with the tube grooving at said perimeter to a rolling action under resilient axial compression, which action is of a nature and force sufficient to preshape the material to an outwardly tapered cross-section and toward a coiled outline about the tube.

4. A method in accordance with claim 3, in which the fin material is subjected to the rolling action between surfaces rotatable on axes at substantially 90° to one another.

5. A method for use in the forming of an attached fin type of tube, comprising the steps of subjecting the tube to a positively rotative grooving action serving to provide a helical groove thereon and to produce a rotation and axial advance of the tube, supplying elongated fin material to the perimeter of the grooved tube in a direction transverse of the axis thereof, subjecting the material as it is engaged with the tube grooving at said perimeter to a rolling action under adjustably resilient axial compression, which action is of a nature and force sufficient to preshape the material to an outwardly tapered cross-section and toward a coiled outline about the tube.

References Cited by the Examiner

UNITED STATES PATENTS

| 1,668,534 | 5/1924 | Berg | 29—157.3 |
| 1,884,203 | 10/1932 | Pickhard | 29—157.3 |
| 2,330,556 | 9/1943 | Carlson et al. | 29—157.3 |
| 2,792,050 | 5/1957 | Edwards | 29—202 |
| 2,918,962 | 12/1959 | Jones | 153—64.5 |
| 3,000,084 | 9/1961 | Garland | 29—157.3 |
| 3,055,082 | 9/1962 | Garland | 29—157.3 X |
| 3,077,928 | 2/1963 | Nihlen et al. | 29—157.3 X |

FOREIGN PATENTS

| 117,992 | 2/1901 | Germany. |
| 547,511 | 9/1956 | Italy. |

WHITMORE A. WILTZ, *Primary Examiner.*

JOHN F. CAMPBELL, *Examiner.*

J. D. HOBART, *Assistant Examiner.*